United States Patent [19]
Choi

[11] Patent Number: 5,381,276
[45] Date of Patent: Jan. 10, 1995

[54] OPTIMUM RECORDING/REPRODUCING APPARATUS

[75] Inventor: Kyung-hwan Choi, Suwon, Rep. of Korea

[73] Assignee: Samsung Electronics Co., Ltd., Kyungki, Rep. of Korea

[21] Appl. No.: 115,139

[22] Filed: Sep. 2, 1993

[30] Foreign Application Priority Data

Sep. 2, 1992 [KR] Rep. of Korea .............. 92-15934

[51] Int. Cl.$^6$ .................................................. G11B 05/09
[52] U.S. Cl. ........................................... 360/51; 360/46
[58] Field of Search ................ 360/51, 53, 46, 65, 360/45, 32, 13, 70

[56] References Cited

U.S. PATENT DOCUMENTS

| | | | |
|---|---|---|---|
| 4,809,090 | 2/1989 | Suzuki | 360/46 |
| 4,823,207 | 4/1989 | Kobayashi et al. | 360/32 |
| 4,862,292 | 8/1989 | Enari et al. | 360/32 X |
| 4,881,136 | 11/1989 | Shiraishi et al. | 360/45 X |
| 4,908,722 | 3/1990 | Sonobe | 360/46 |
| 5,057,949 | 10/1991 | Suga et al. | 360/70 |
| 5,077,623 | 12/1991 | McSweeney | 360/65 X |
| 5,084,786 | 1/1992 | Konno et al. | 360/13 |
| 5,119,243 | 6/1992 | Shimazaki et al. | 360/46 |
| 5,151,830 | 9/1992 | Goto et al. | 360/32 |
| 5,267,094 | 11/1993 | Aoki | 360/32 |

*Primary Examiner*—Donald Hajec
*Assistant Examiner*—Thien Minh Le
*Attorney, Agent, or Firm*—Sughrue, Mion, Zinn, Macpeak & Seas

[57] ABSTRACT

An optimum recording/reproducing apparatus for optimally performing recording and reproduction according to the change of data recording and reproducing environments, to record digital data on a predetermined recording medium by using a recording head and reproducing the recorded data by using the reproducing head to be output, includes a recording apparatus comprising a memory, a modulator, an envelope detector and a clock generator, whereby the rate of reading out the data from the memory and the modulating clock signal applied to the modulator are determined according to the clock signal; and a reproducing apparatus comprising a detector, a phase-locked loop (PLL) circuit, a demodulator and a memory.

18 Claims, 14 Drawing Sheets

RECORDING
CURRENT
30 mA

RECORDING
CURRENT
25 mA

RECORDING
CURRENT
20 mA

RECORDING RATE [Mbps] 32

RECORDING RATE [Mbps] 16

RECORDING RATE [Mbps] 10

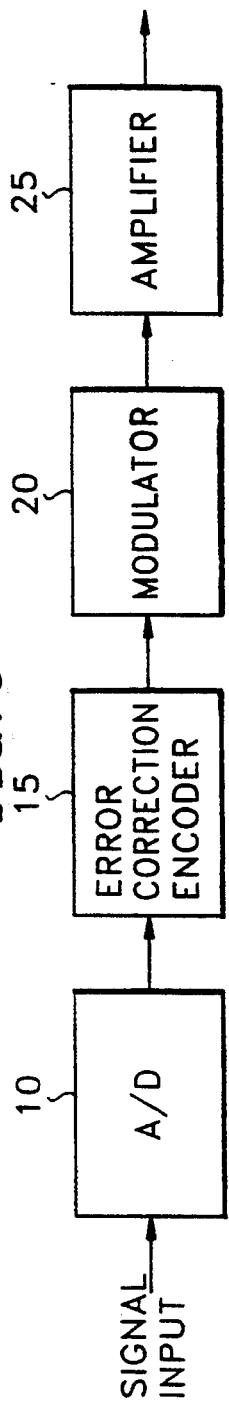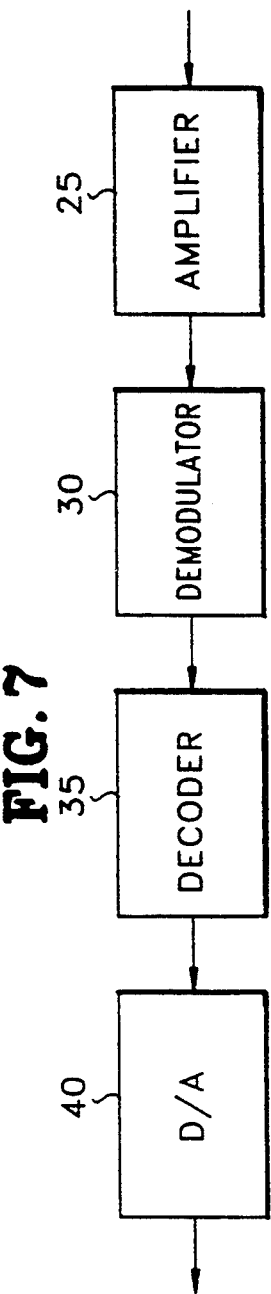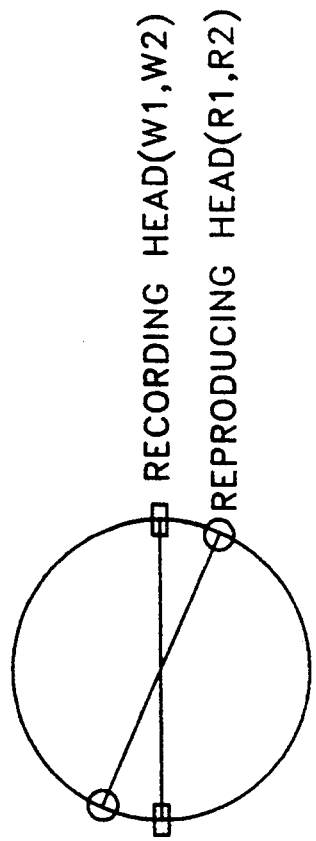

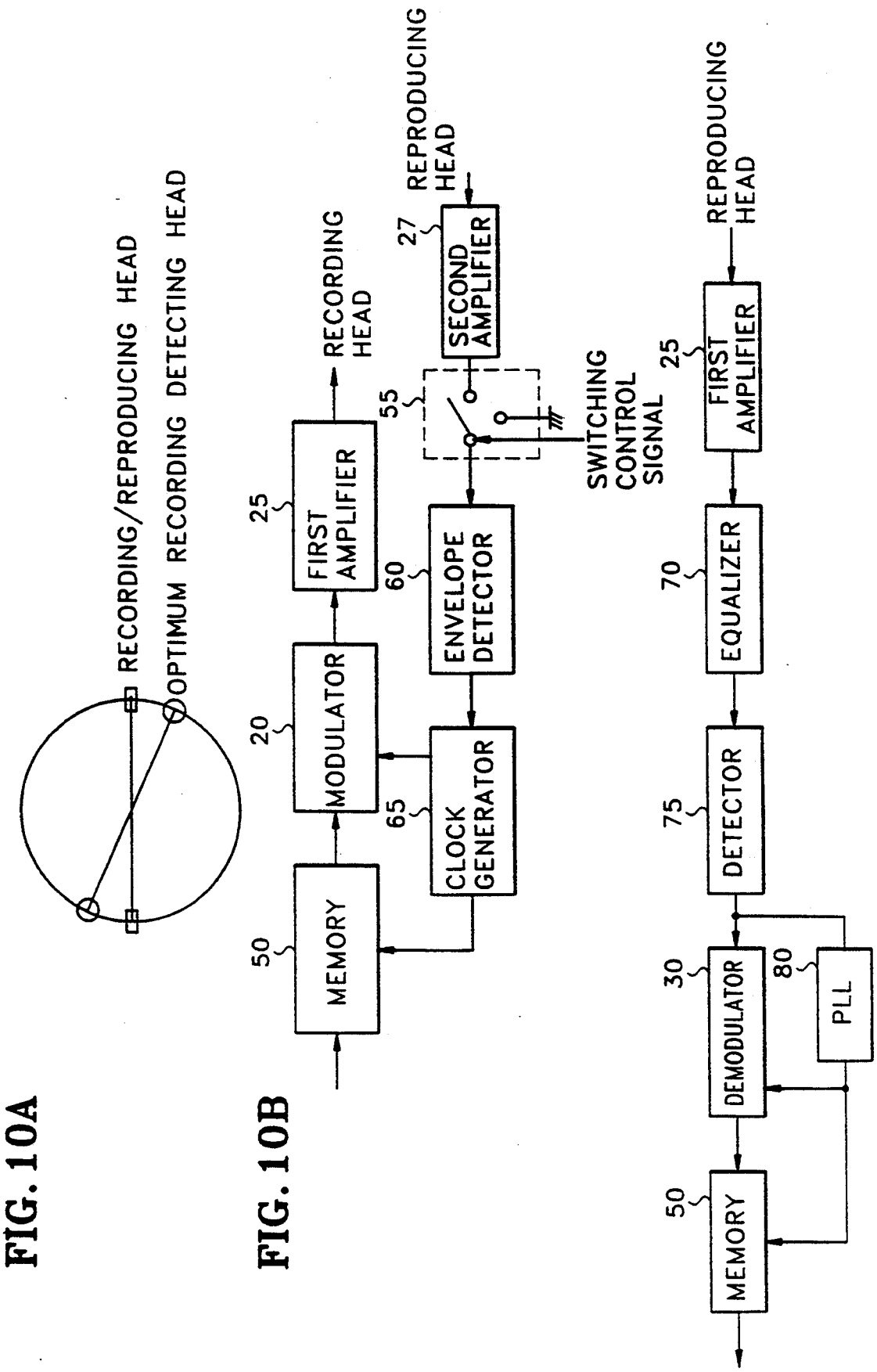

OPTIMUM RECORDING/REPRODUCING APPARATUS

BACKGROUND OF THE INVENTION

The present invention relates to a recording/reproducing apparatus for recording and reproducing picture and sound data, and more particularly, to an optimum recording/reproducing apparatus capable of optimally performing the recording and reproducing of the data while taking into account and adapting to changes in the recording and reproducing environments.

In general, when recording and reproducing picture and sound data, the data are recorded in digital form onto a recording medium such as magnetic tape or a magnetic disk, and thus recorded, are reproduced so as to restore the original image and sound. In recording and reproducing the image and sound data via a predetermined recording medium, there have been continued attempts to increase the quantity of data which can be stored on a medium of limited size, as well as to secure better picture and sound qualities without degradation thereof.

The conventional digital recording/reproduction apparatus is designed to record and reproduce the data while basically fixing the recording rate, error correction capability, and compression ratio at constant values. This, however, prevents the achievement of optimum recording and reproduction since picture and sound quality are easily influenced by the recording medium's characteristics, set apparatus capability, etc.

Moreover, even if a high-quality head (the most important component of a data recording and reproducing apparatus) is well-manufactured, the same type of tape is used for each recording, and each apparatus is manufactured by the same method through the identical production line, thousands or tens of thousands of viewing and listening devices used by the consumer would not have the same capability. Therefore, even if the same picture and sound data are recorded or reproduced, the same sound or picture quality cannot be obtained in use. Accordingly, the choice of recording tape and viewing/listening apparatus may cause differences and degradation in picture and sound quality.

The above-described problems will be explained with reference to FIGS. 1 through 5, which show actual experimental data.

FIG. 1 illustrates the relationship between the distance (gap) between the head of the set apparatus and the recording medium, i.e., the tape, and the reproduced output. Referring to FIG. 1, as the distance between head and tape decreases, the reproduced output increases. Thus, it should be noted that even if all set apparatus are made as identically as possible, minute changes in the distance between head and tape produce differences in reproduced output.

FIG. 2 shows the relationship between tape type and reproduced output. Referring to FIG. 2, tape NEW ME, which has composition of Hc=1680(Oe) and Br=4050(Oe), exhibits the best characteristics of the types shown. Accordingly, it should be noted that when recording/reproduction is performed by a given apparatus, reproduction output differs according to the composition of the tape on which the data are recorded.

FIG. 3 shows the relationship between thickness of the body of the magnetic tape and reproduction loss. In FIG. 3, the difference of reproduction loss is shown for thicknesses of 0.20 $\mu$m and 0.25 $\mu$m, with less reproduction loss being attained when the body of the magnetic tape is 0.20 $\mu$m thick. Thus, a thinner tape dimension reduces reproduction loss.

FIGS. 4A, 4B and 4C show the relationship between recording current and reproduction characteristic. Here, it is noted that for the same recording signal, even small changes in recording current produce different reproduction characteristics.

FIGS. 5A, 5B and 5C show the relationship between the recording bit rate and the reproduction characteristic. A lower recording bit rate results in better reproduction characteristics. The characteristics are variable according to the kind of tape, the head's capability, and the performance of recording current.

The operation of a conventional digital signal recording/reproducing apparatus (made without taking into consideration the specific characteristics of the tape, head, set apparatus, etc.) will be briefly described with reference to FIGS. 6 and 7.

FIG. 6 is a block diagram illustrating the conventional digital recording apparatus. Referring to FIG. 6, reference numeral 10 denotes an analog-to-digital (A/D) converter for converting an analog signal into digital form, 15 denotes an error correction encoder for error-correction, 20 denotes a modulator for modulating the data to be adapted for the channel characteristic, and 25 denotes an amplifier for amplifying the data signal to the proper amplitude for being recorded onto the recording medium. Audio data are in analog form and are therefore converted into the form of a digital signal via A/D converter 10. The converted data are input to error correction encoder 15 (in general, a Reed Solomon (RS) coder is used) for detecting and correcting errors. The error-corrected data are modulated by modulator 20 to be suitable for the channel characteristic thereof. That is, if the digital data are communication data, the data are frequency modulated into a communication frequency band. When the data are to be recorded on a recording medium, e.g., magnetic tape, the data are modulated into a frequency band suitable for recording. Having been modulated adaptively for a specific channel's characteristics, the digital data are then amplified to the proper amplitude by amplifier 25, so as to be recorded on the recording medium.

FIG. 7 is a schematic block diagram showing the conventional digital reproducing apparatus. Referring to FIG. 7, reference numeral 25 denotes an amplifier for performing the same function as that of FIG. 6, 30 denotes a demodulator for performing the inverse procedure of the modulation performed in the above recording process, 35 denotes a decoder for decoding the input data, and 40 denotes a digital-to-analog (D/A) converter for converting a digital signal into an analog signal. The digital signal reproducing apparatus as shown in FIG. 7 reproduces the picture or sound digital data from the recording medium, using the reproducing head shown in FIG. 8, then receives the reproduced data via amplifier 25, to thereby amplify the data up to a predetermined amplitude. The thus-amplified signal enters demodulator 30 and undergoes a demodulation process which is the inverse of that performed during recording, to be demodulated. The thus-demodulated data are error-detected and error-corrected by error correction decoder 35 (a Viterbi decoder or RS decoder can be used). The error-corrected picture or sound digital data are converted into analog form by D/A converter 40, and are then transmitted to a display device and speaker or the like, for output as a picture with sound.

The conventional digital recording/reproducing apparatus shown in FIGS. 6 and 7 performs the recording and reproduction of data after fixing the data recording rate and track length, and therefore picture and sound quality are degraded according to differences in the recording medium's characteristics and variations in the system's capability.

Also, as most electrical and electronic products are mass-produced, even the consistent use of a particular head type, recording medium (i.e., tape), and recording-/reproducing apparatus cannot guarantee consistent recording and reproduction quality. That is, a user may employ tapes manufactured with various substances, such that data cannot be recorded on the recording medium at the optimum condition and the recorded data cannot be reproduced under optimum conditions. Accordingly, the sound and picture quality are unavoidably degraded.

SUMMARY OF THE INVENTION

An object of the present invention is to provide an optimum recording/reproducing apparatus for recording and reproducing picture and sound data under optimum conditions, regardless of the substance constituting the recording medium or the capability of a given system.

Another object of the present invention is to provide an optimum recording/reproducing apparatus for recording and reproducing picture and sound data from a predetermined recording medium under optimum conditions, by compressing the data-to-be-recorded at the optimum compression ratio for recording and expanding the thus-compressed data at the optimum expansion ratio for reproduction.

To accomplish the above-described objects, an optimum recording/reproducing apparatus according to the present invention provides a recording/reproducing apparatus for recording digital data on a predetermined recording medium by means of a recording head, and for reproducing the thus-recorded data by means of a reproducing head, the apparatus comprising:

a recording apparatus including a memory for storing an input digital data signal therein; a modulator for modulating the data read-out from the memory according to a predetermined clock signal and channel characteristic, thereby producing the modulated data for the recording head; an envelope detector for simultaneously detecting the signal envelope value from the data reproduced by the reproducing head while recording the data signal on the recording medium using the recording head; and a clock generator for producing a clock signal whose frequency is varied according to the detected result from the envelope detector, thereby determining the data rate read out from the memory according to the clock signal and the modulating clock signal applied to the modulator; and a reproducing apparatus including a detector for detecting the recorded signal among the reproduced signal by means of the reproducing head; a phase-locked loop (PLL) circuit for detecting the reproduction clock signal among the output signal from the detector; a demodulator for demodulating the detected data from the detector according to the reproduction clock signal from the PLL circuit, according to channel characteristics; and a memory for temporarily storing therein the data supplied by the demodulator and outputting the thus-stored data according to the clock signal provided by the PLL circuit.

BRIEF DESCRIPTION OF THE DRAWINGS

These and other objects, features, aspects and advantages of the present invention will become more apparent from the following detailed description of the present invention when taken in conjunction with the accompanying drawings, in which:

FIG. 6 is a schematic block diagram showing a conventional digital signal recording apparatus;

FIG. 7 is a schematic block diagram showing a conventional digital signal reproducing apparatus;

FIGS. 8A and 8B are a schematic diagrams showing an embodiment of the optimum recording/reproducing apparatus according to the present invention;

FIGS. 10A and 10B are schematic diagrams showing another embodiment of the optimum recording/reproducing apparatus according to the present invention.

DETAILED DESCRIPTION OF THE INVENTION

Hereinafter, the present invention will be described in more detail, with reference to the attached drawings.

FIG. 8A briefly illustrates the head which is adopted in an embodiment of the present invention. The head is designed so as to comprise recording heads W1 and W2 for the conventional recording and reproduction, and reproducing head R1 and R2 for the reproduction, separately.

Figure 1:
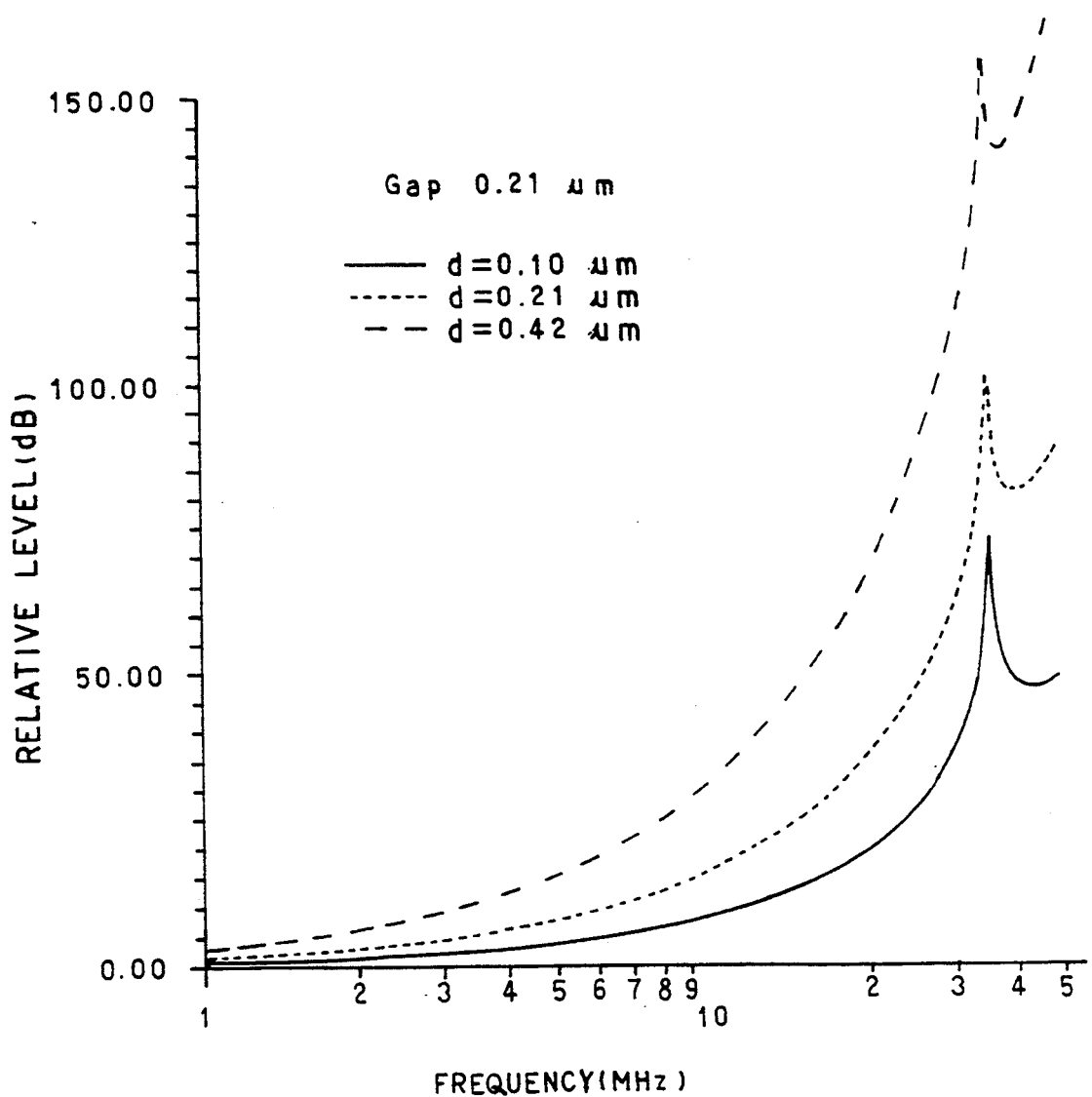
FIG. 1 shows a relationship between the distance between head and tape of a given recording/reproducing apparatus and the reproduction output.
Figure 2:
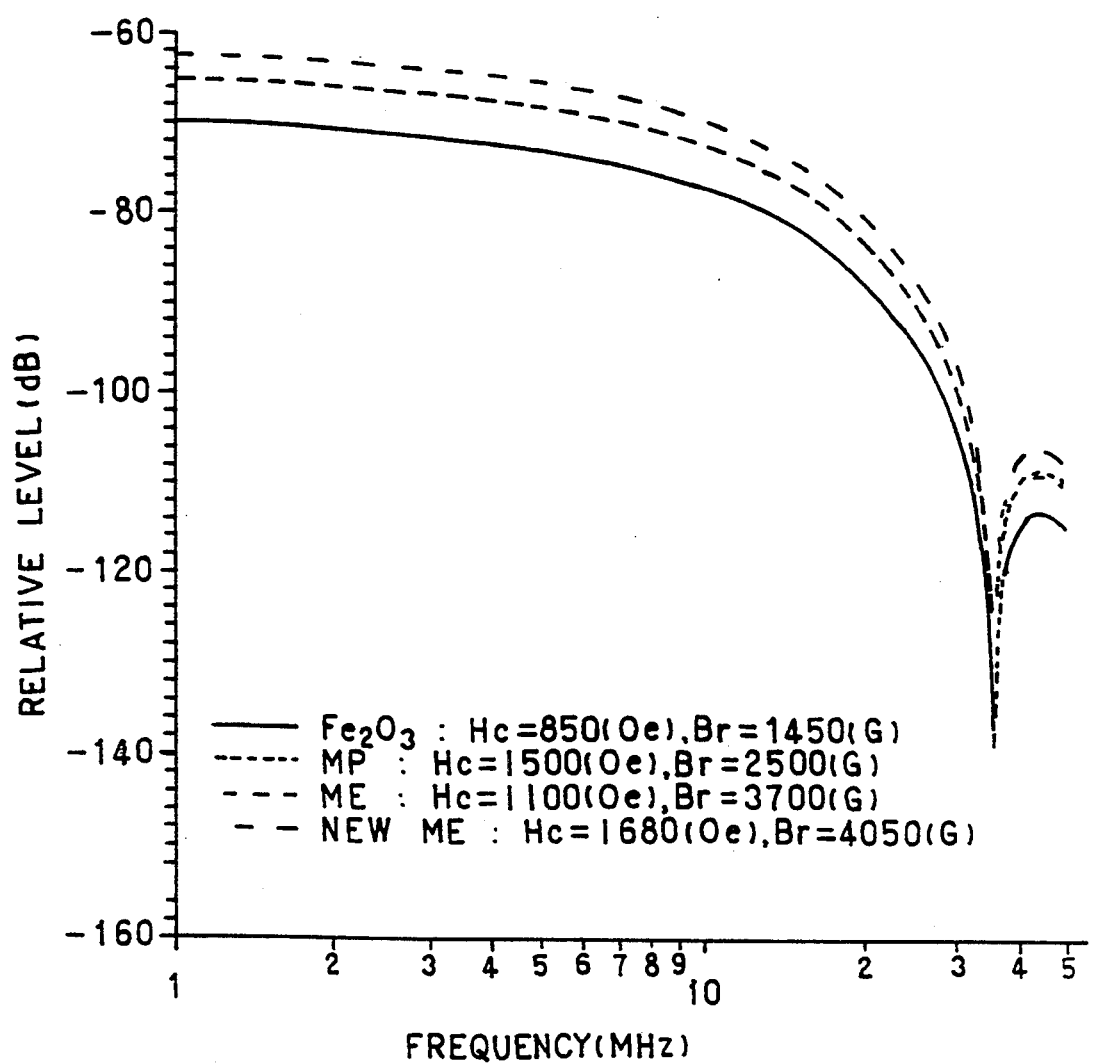
FIG. 2 is a diagram showing a relationship between tape type and reproduction output.
Figure 3:
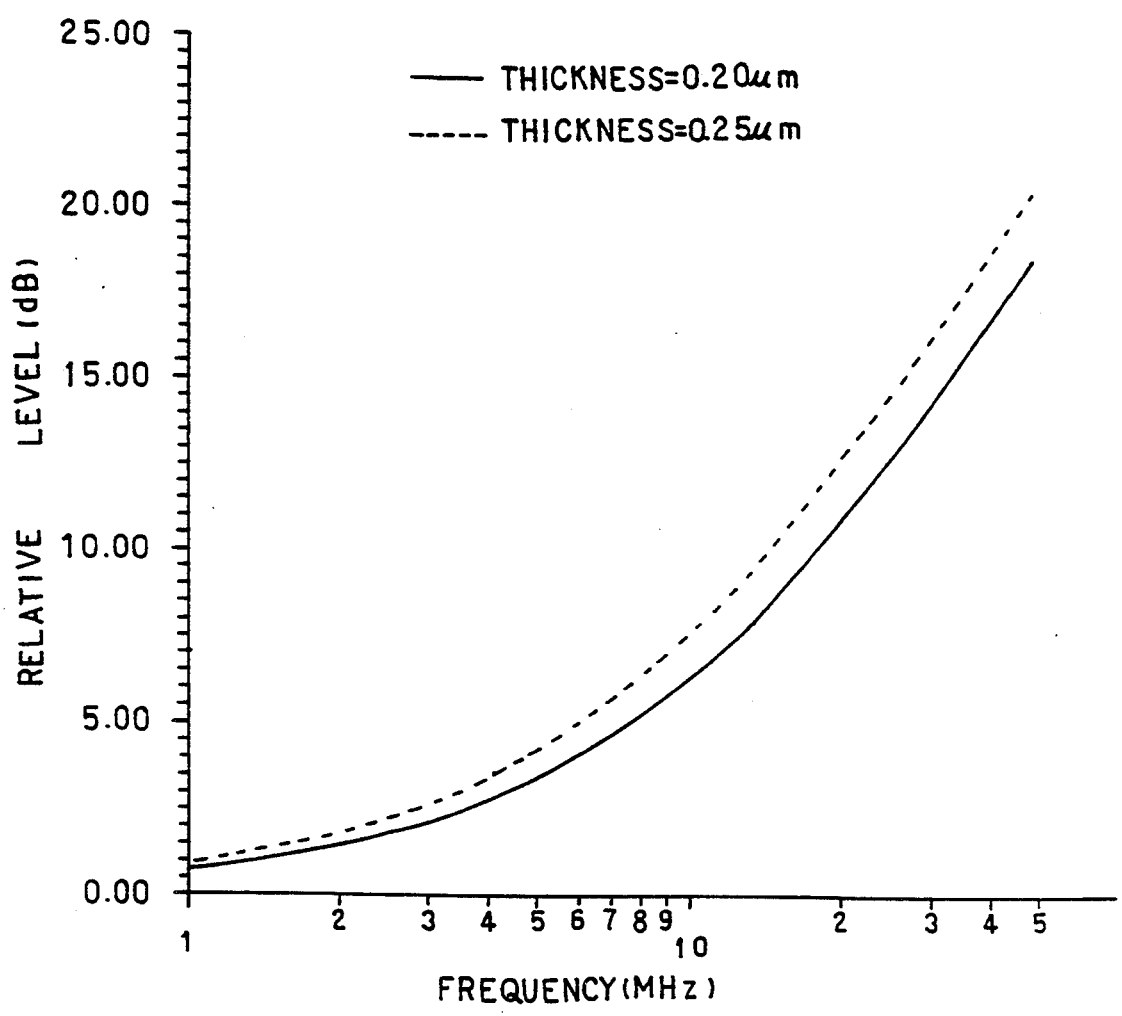
FIG. 3 is a diagram showing the relationship between thickness of the body of a magnetic tape and reproduction loss.
Figure 4A:
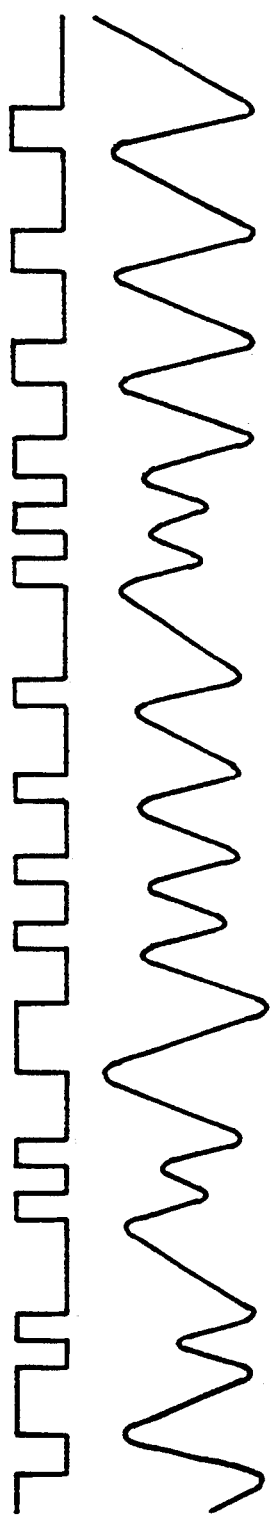
FIGS. 4A, 4B and 4C are diagrams showing the relationship between recording current and reproduction characteristics.
Figure 4B:
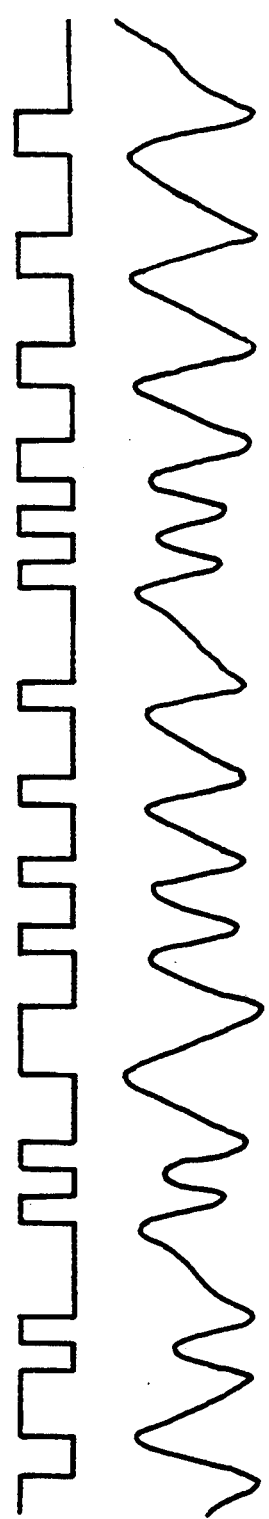
Figure 4C:
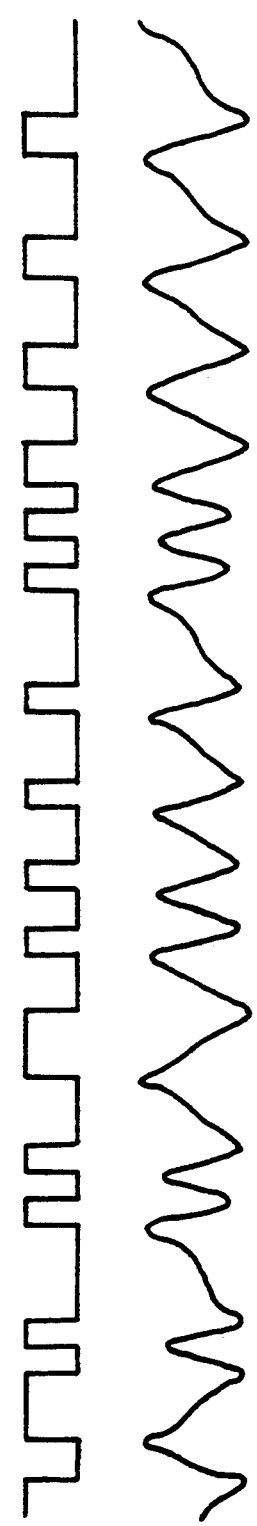
Figure 5A:
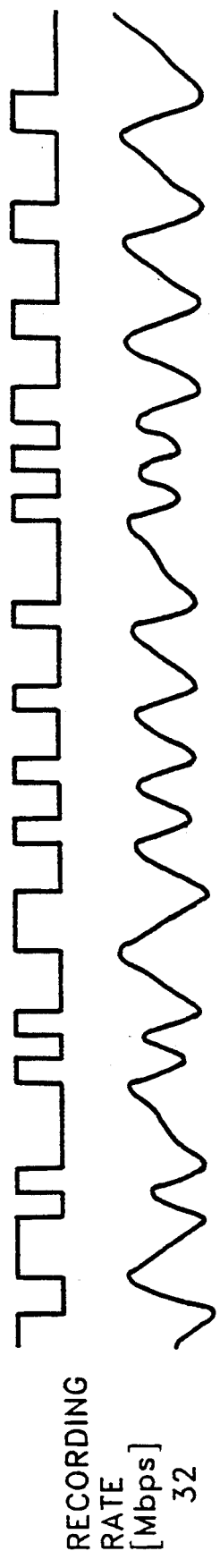
FIGS. 5A, 5B and 5C are diagrams showing the relationship between recording bit rate and reproduction characteristics.
Figure 5B:
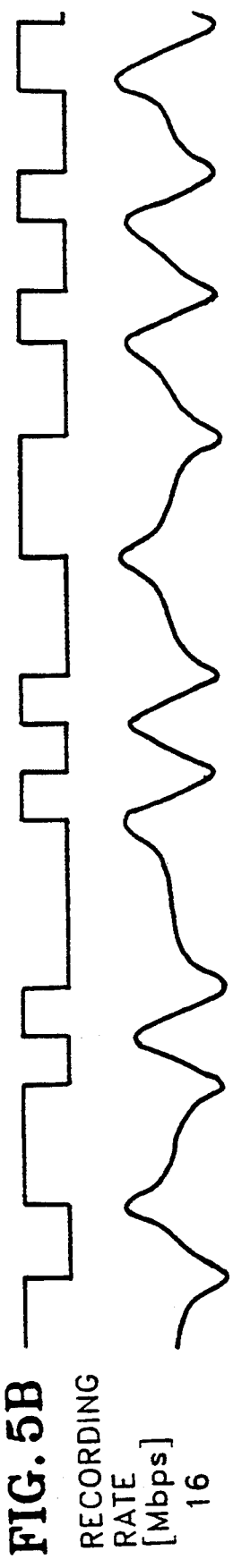
Figure 5C:
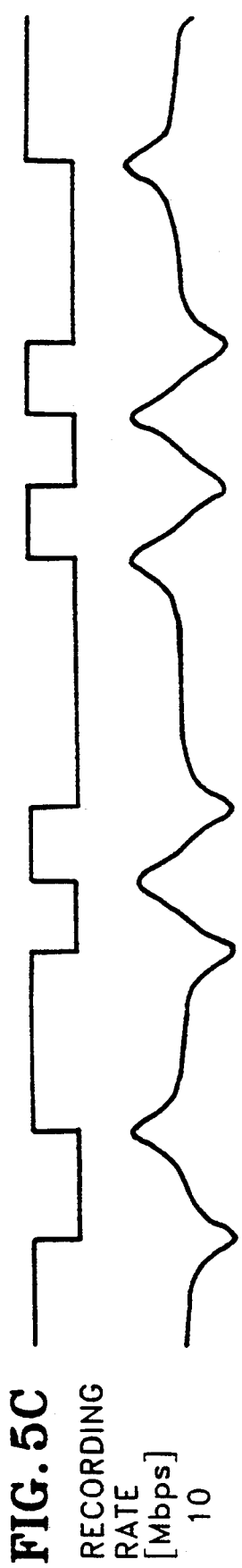
Figure 8B:
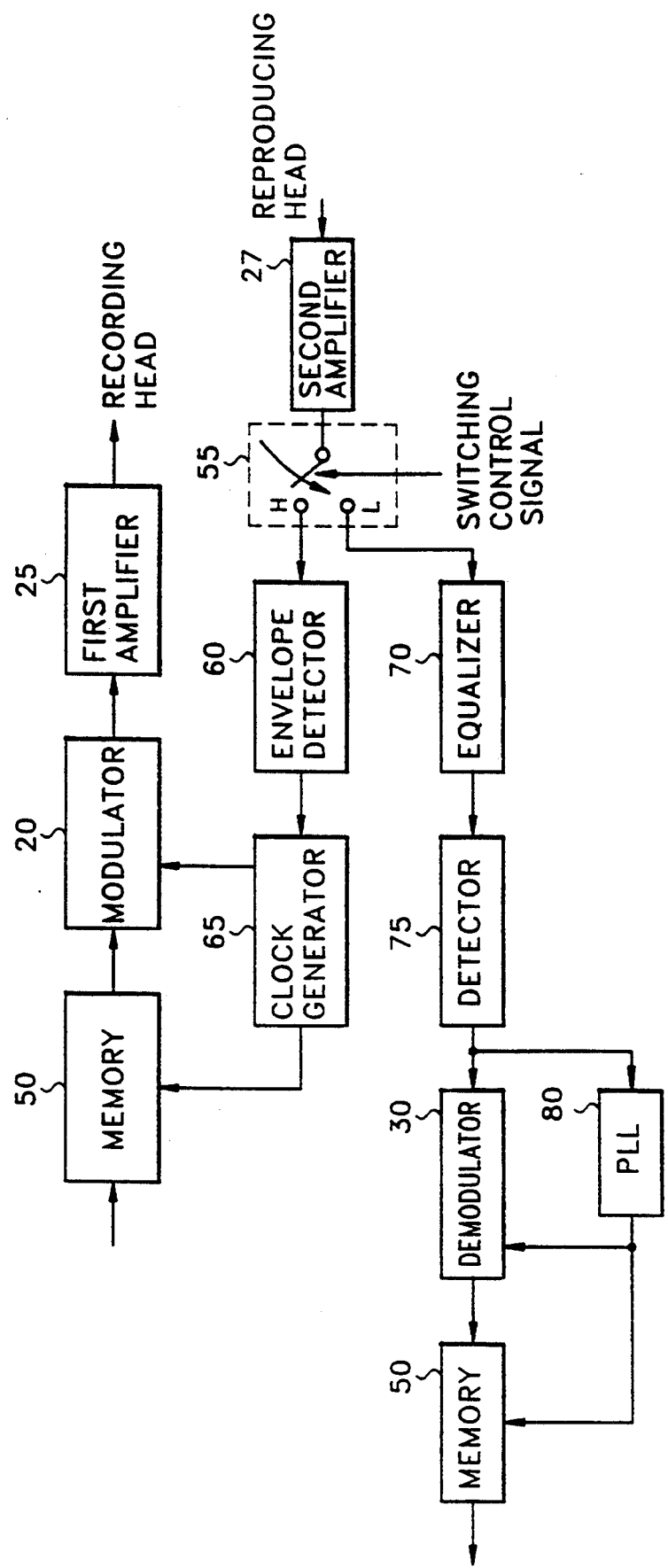

FIG. 8B is a block diagram illustrating an embodiment of the optimum recording/reproducing apparatus. Here, when performing the recording and reproduction, a recording/reproducing head as shown in FIG. 8A is used. Referring to FIG. 8B, modulator 20, first and second amplifiers 25 and 27, and demodulator 30 perform the same functions as those of the conventional digital signal recording/reproducing apparatus shown in FIGS. 6 and 7. Reference numeral 50 denotes a memory for temporarily storing the input digital recording signal therein, 55 denotes a switch for switching to recording or reproduction, 60 denotes an envelope detector for detecting the envelope of the signal detected from the optimum recording detecting head, 65 denotes a clock generator for generating a clock signal whose period is varied according to the amplitude of the input signal, 70 denotes an equalizer, 75 denotes a detector, and 80 denotes a phase-locked loop (PLL).

Hereinafter, as an embodiment of present invention, the operation of an optimum recording/reproducing apparatus constructed as described above will be described.

First of all, an operation of recording the data at an optimum state is described.

The picture and/or sound digital data which are to be recorded are input via an input terminal (not pictured), so as to be recorded in a memory 50. The recorded data are output from memory 50, according to the predetermined reference clock signal which are generated from clock generator 65. The output data are modulated in accordance with the channel characteristics and amplified to a predetermined magnitude suitable for the recording by means of first amplifier 25. These amplified data are transmitted to recording heads W1 and W2, so as to be recorded on the recording medium.

During data recording, the data are recorded, and simultaneously, the recorded data are reproduced by reproducing heads R1 and R2. A switch 55 is connected to node H, according to the switching control signal from a microcomputer (not shown), and the amplified signal is transferred to an envelope detector 60 via switch 55. Envelope detector 60 detects the envelope value of the amplified digital signal. Preferably, the detected value corresponds to the absolute value of the difference between the upper and lower bounds of the data which are input to the envelope detector.

Envelope detector 60 provides clock generator 65 with the envelope value, and thereby the clock rate of the clock generator is changed according to the envelope value. That is, if the detected envelope value is less than a reference value, the clock rate of clock generator 65 is changed to increase the envelope value. On the contrary, if the envelope value is greater than the reference value, the clock rate of clock generator 65 is changed to decrease the envelope value. The construction and operation of the clock generator which functions as described above will be hereinafter described, with reference to FIG. 9.

Figure 9A:
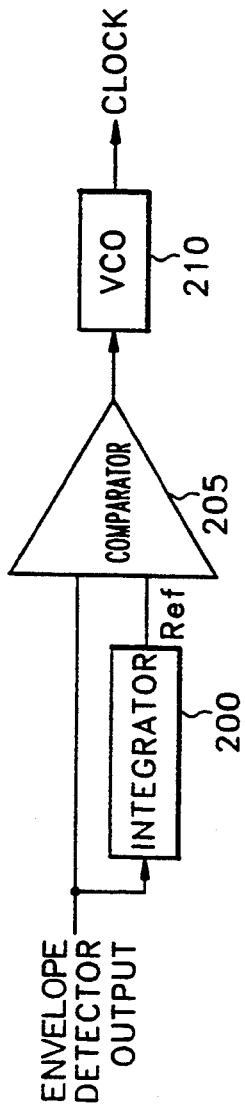
FIGS. 9A and 9B are detailed circuit diagrams showing a clock generator used in an optimum recording/reproducing apparatus according to the present invention.

Referring to FIG. 9A, clock generator 65 (FIG. 8B) comprises an integrator 200, a comparator 205 and a voltage controlled oscillator (VCO) 210. The clock generator 65 receives the output of envelope detector 60, and compares the integrated signal of integrator 200 with the non-integrated signal at comparator 205. Next, the operation of VCO 210 is controlled according to the result of the comparison. In other words, a greater envelope value leads to the generation of a faster clock, and a smaller envelope value leads to the generation of a slower clock. The envelope value thereby regulates the recording clock to ensure that data recording proceeds at an optimum rate.

Figure 9B:
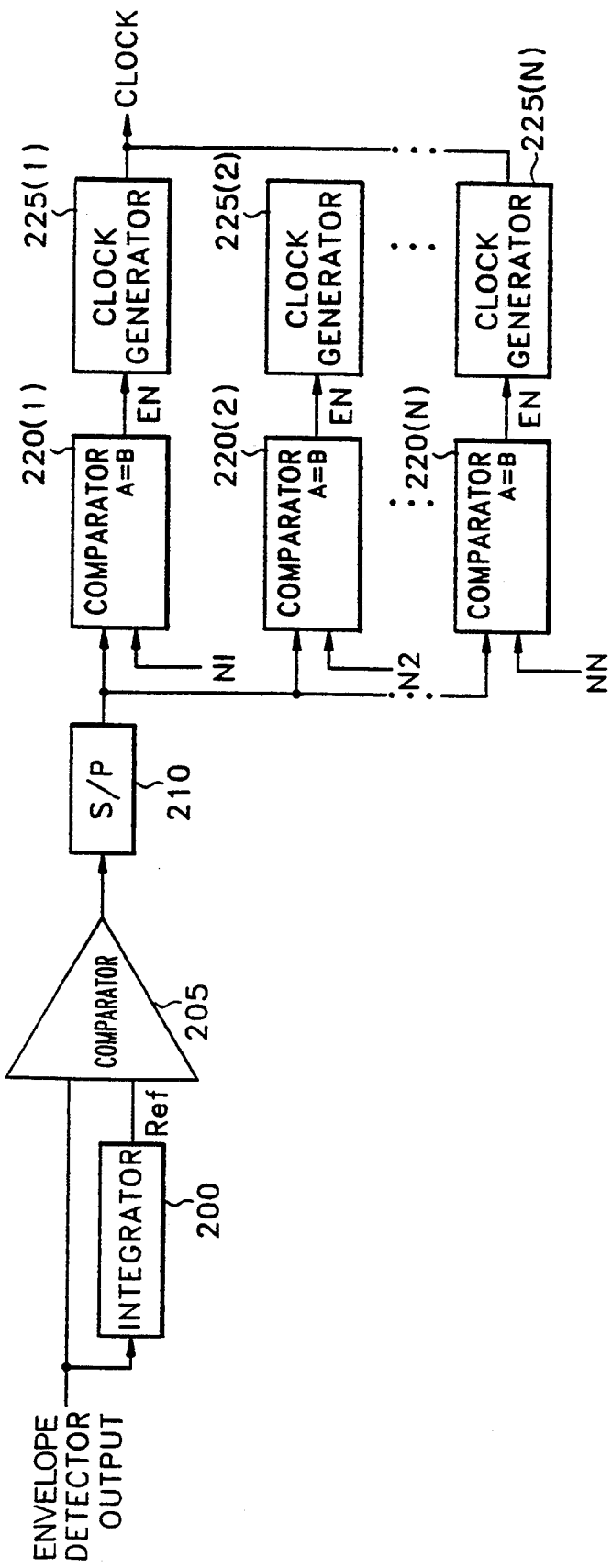

In one embodiment, shown in FIG. 9B, a clock generator similar to the clock generator shown in FIG. 9A further comprises a plurality of comparators 220(1), 220(2), ..., 220(N), and a plurality of basic clock generators 225(1), 225(2), ..., and 225(N). The clock generator receives the output of envelope detector 60, and compares the integrated signal of integrator 200 with the non-integrated signal by means of comparator 205. The compared result is converted into parallel data by using a serial-to-parallel converter 215. This result is compared with each reference value of the plurality of comparators 220(1) through 220(N). Each comparator 220(1), 220(2), ..., 220(N) compares the result with a different reference value, each corresponding clock generator being capable of generating a correspondingly different clock rate signal. If the converted data result is equal to one of the reference values, the corresponding comparator outputs a logic high signal (H) as an enable signal, and the operation of the corresponding clock generator among clock generators 225(1) through 225(N) is enabled. In this way, the optimum clock signal is output according to the output of the envelope detector.

By this principle, if an envelope value is greater than the reference value, the rate of data recording is increased, so that a faster clock is generated. Also, for the contrary case, a slower clock is generated, and thereby the optimum clock rate can be found.

As described above, the envelope value is checked from the recording signal which is reproduced simultaneously while the signal is being recorded. Thus, the current clock rate is changed to the optimum clock signal, and the quantity of data output from memory 50 and the modulating clock of modulator 20 are controlled. Therefore, the data can be recorded on the recording medium in an optimum state.

Next, an optimum reproducing operation for the recorded data of the recording medium will be described with reference to FIGS. 8A and 8B.

The data reproduced by reproducing heads R1 and R2 are amplified to create signals which are greater than the predetermined magnitude, using a second amplifier 27. According to the control signal of microcomputer (not shown), switch 55 is switched to node L. When switch 55 switches to node L, the amplified signal from second amplifier 27 is input to an equalizer 70, so as to compensate for the degradation of frequency characteristics and the like. The output of equalizer 70 is input to a detector 75, and the output of the detector is input to a phase-locked loop (PLL) 80 wherein the reproducing clock signal (the clock rate of the data signal) is detected.

The reproducing clock signal is supplied to demodulator 30 and memory 50. The data reproduced according to the clock signal are demodulated by demodulator 30, so as to be recorded in memory 50. The data recorded in memory 50 are reproduced at an optimum state according to the reproducing clock signal provided by PLL 80.

Recording can be performed at the optimum bit recording rate in the above-described manner. While the recorded signal is reproduced, the reproduction of signal is performed according to the reproducing clock signal, which thereby enables the optimum reproduction.

FIGS. 10A and 10B are schematic block diagrams illustrating another embodiment of the optimum recording/reproducing apparatus according to the present invention.

FIG. 10A briefly shows a head which is applied to this embodiment of the invention. The same heads RW1 and RW2 are used for recording/reproducing, and supplementary heads OD1 and OD2 are used for performing the optimum recording/reproducing according to the present invention. FIG. 10B is a schematic block diagram of the recording/reproducing circuit adopting the head of FIG. 10A. The components of the recording/reproducing circuit of FIG. 10B are essentially the same as the corresponding components of FIG. 8B.

An embodiment for performing the data recording at an optimum state is now described.

The apparatus of FIG. 10B has supplementary recording detection heads OD1 and OD2 for performing the optimum recording/reproducing operation, since it performs recording and reproduction by using the same heads RW1 and RW2. The input digital data signal is recorded in memory 50', and the data recorded in memory 50' are output according to the predetermined reference clock rate of clock generator 65'. Next, the output data from memory 50' are modulated by modulator 20', and then amplified to the predetermined magnitude by first amplifier 25', so as to be recorded in the recording medium.

The data are recorded on the recording medium as described above, and simultaneously the recorded data are reproduced and output by optimum recording reproducing heads OD1 and OD2. The output data are amplified by second amplifier 27', and then by the connection of switch 55' according to the switching control signal of the microcomputer (not shown), the amplified signal is applied to envelope detector 60', and thereby the envelope value is detected. According to the magnitude of the detected value, the clock rate of clock generator 65' is determined, and then the corresponding clock signal is supplied to memory 50'. Thus, the rate of the recording signal's output from memory 50' is controlled, and optimum recording performance can be attained.

The reproduction operation of this apparatus, comprising components 25', 30', 50', 55', 70', 75', and 80', is identical with that of FIG. 8B, except for the change of the signal's flow due to the switching operation of switch 55'. Thus, the explanation thereof will be omitted.

Figure 11:
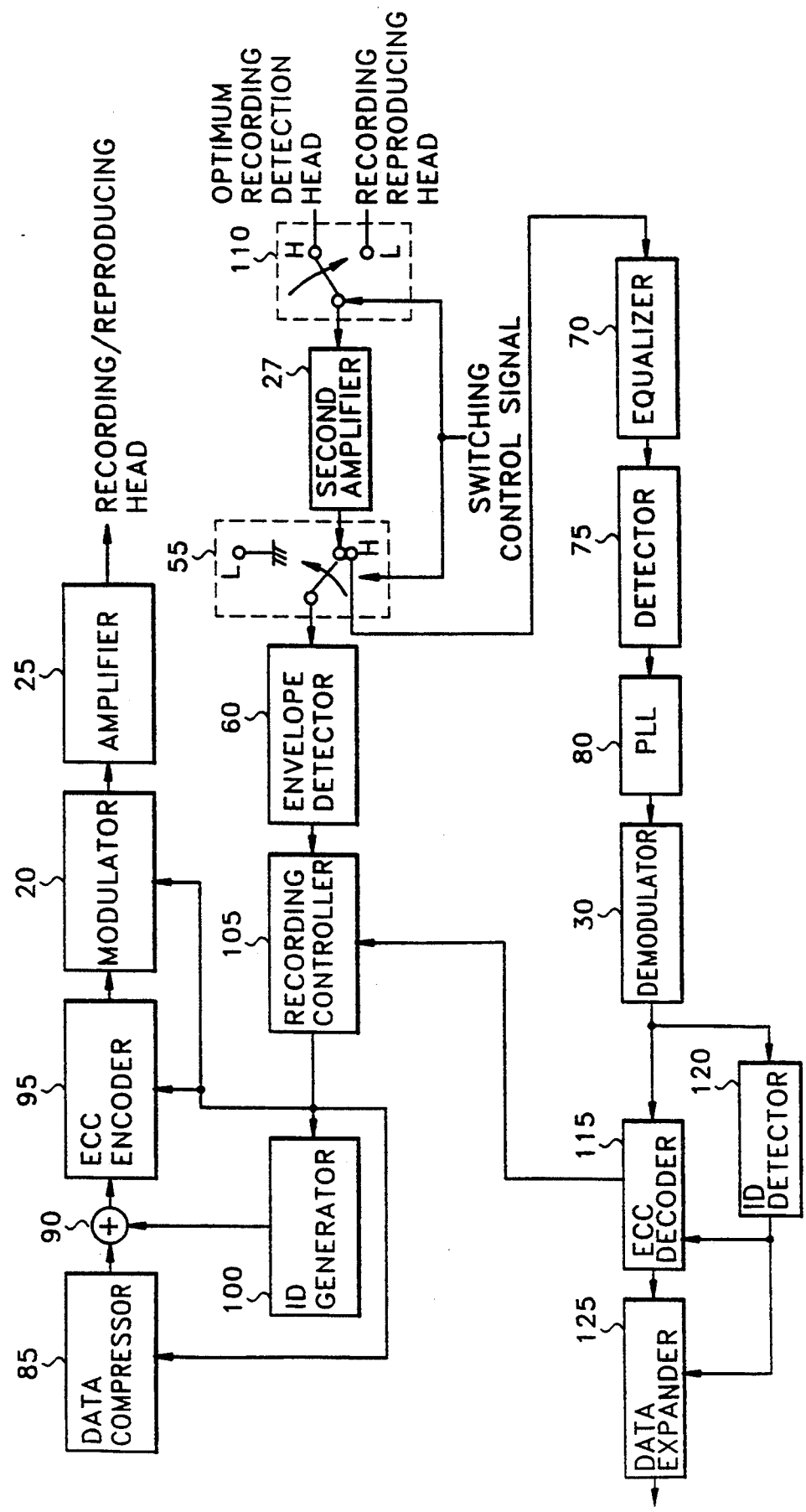
FIG. 11 is a block diagram showing still another embodiment of the optimum recording/reproducing apparatus according to the present invention.

FIG. 11 shows another embodiment of the optimum recording reproduction apparatus according to the present invention, and refers to the optimum recording reproduction apparatus for controlling data compression ratio and performing error correction and modulation, etc.

Referring to FIG. 11, corresponding components are essentially the same as those of the above-described embodiments as shown in FIGS. 8B and 10B. In FIG. 11, reference numeral 85 denotes a data compressor for compressing the data by a predetermined compression ratio using the conventional compression method, 90 denotes a mixer for mixing the compressed signal with the identification signal generated from identification (ID) generator 100 which is described hereinbelow, 95 denotes an error correction code (ECC) encoder, 100 denotes an ID generator, 105 denotes a recording controller for controlling the error correction and the compression ratio by which the signal to be recorded, 110 denotes a second switch for switching according to the switching control signal, 115 denotes an ECC decoder, 120 denotes an ID detector for detecting ID signal from the reproduced signal, and 125 denotes a data expander for expanding the compressed data.

The operation in this embodiment comprised as above is now described. Here, the recording head is the same as that used in the embodiment of FIG. 10B, and the optimum recording detection head has supplementary recording detection heads as well.

The data which are converted to a form of digital data by the analog/digital conversion of an analog-to-digital converter (not shown) is input to data compressor 85, and then the input data are compressed according to the predetermined reference data compression ratio from recording controller 105 by using the conventional compression method. The compressed data go through ECC encoder 95 for performing the reference correction, and is then modulated by modulator 20 according to the reference clock. Thereafter, the modulated signal is amplified by first amplifier 25 and is transferred to recording heads RW1 and RW2, to be recorded in the recording medium.

The recorded signal is immediately reproduced by using the optimum recording detection heads OD1 and OD2 while the data are recorded. During the recording operation, the microcomputer transfers the corresponding switching control signal to first and second switches 55" and 110, on recognizing that recording is being performed. The switching control signal from the microcomputer is set to a high state (H) while recording and set to a low state (L) while reproducing. Therefore, during recording, the switching control signal is applied to second switch 110, which is thereby connected to node $L_2$, and the reproduced signal is input to second amplifier 27", which results in a digital signal which is greater than a predetermined magnitude. The switching control signal is applied to first switch 55", which is thereby set to low node $L_1$.

When first switch 55" switches to node L according to the switching control signal, the reproduced and amplified signal is input to envelope detector 60". Envelope detector 60" detects the envelope value of the input signal and forwards the value to recording controller 105. Recording controller 105 determines recording rate, compression rate, etc. for the optimum recording according to the input signal. The detailed construction of the record controller is now described with reference to FIG. 12.

Figure 12:
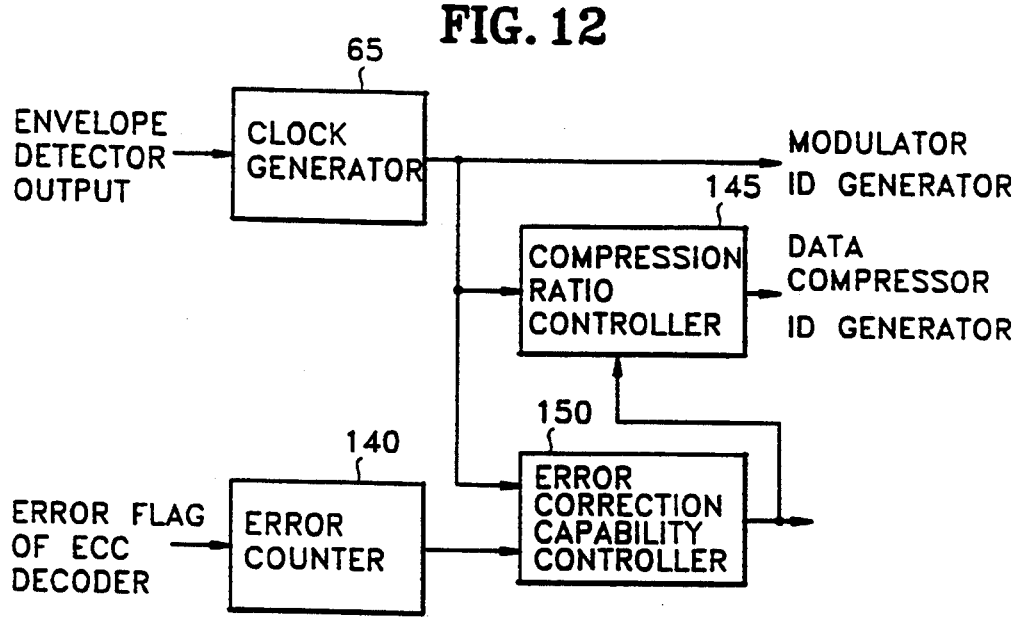
FIG. 12 is a detailed block diagram showing the recording controller shown in FIG. 11.

The recording controller shown in FIG. 12 comprises a clock generator 65" for generating the clock, an error counter 140 for counting the error flag output from ECC decoder 115 (FIG. 11), compression ratio controller 145 for controlling the compression ratio, and an error correction controller 150. These components will be described with respect to their operation.

As described above, clock generator 65" controls the clock operation in accordance with the magnitude of the signal envelope detected by envelope detector 60". That is, if the detected envelope value is greater than the reference value, a faster clock is generated, and otherwise a slower clock is generated, so as to generate the optimum clock frequency. Accordingly, the corresponding clock signal is output to modulator 20" and to ID generator 100.

Figure 13:
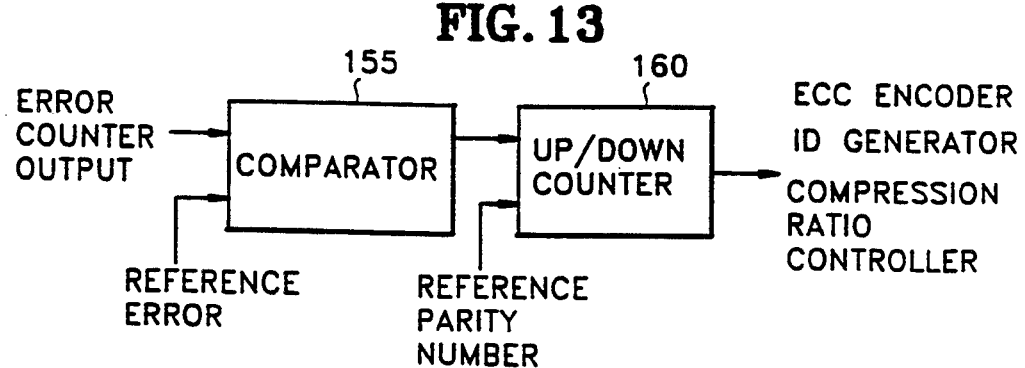
FIG. 13 is a detailed block diagram showing the error correction controller shown in FIG. 12.

Error counter 140 receives the error flag from ECC decoder 115, counts the number of corresponding flags, and outputs the count value to the error correction capability controller 150. In this way, error correction controller 150 controls the error correction capability according to the input count value and to the clock signal of the clock generator. Control of the error correction capability carried out by error correction controller 150 is described with reference to FIG. 13, in which the inner section of the error correction controller 150 is shown.

The error correction controller 150 of FIG. 12 comprises comparator 155 and up/down counter 160. Comparator 155 compares the count value outputted by error counter 140 with the predetermined number of reference errors of the system. The up/down counter 160 is operated according to the comparing result and is loaded with the number of reference parities.

In general, "parity" is used to fix the number of bits having the value of "1" as an odd or even number, to determine thereby whether the data has been (or is being) recorded correctly. However, "parity" in the present invention is used to correct data errors. Here, the error correction capability is varied according to the number of "parities" attached to a given sample of data. For example, if the number of parities (or "parity symbols") is five, up to three errors can be detected and two errors can be corrected among the detected errors. The number of reference parities functions as a reference value. In order words, if, as a result of the comparison by comparator 155, the output of error counter 140 is greater than the number of reference errors allowed by the system, the output of the comparator 155 goes to high, and thereby the value of up/down counter 160 is increased. In the opposite case, the number is reduced so as to control the number of parities. An increase in the value of up/down counter 160 means that many errors are present, and that the number of parities should be increased so as to enhance the correction capability. A decrease in the value of up/down counter 160 means that too many parities exist, and that the number of parities should be decreased so as to reduce the error correction capability.

Figure 14:
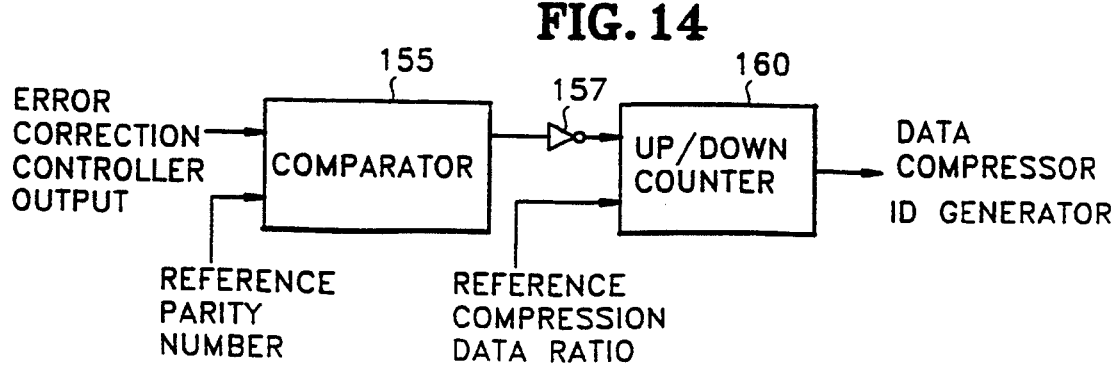
FIG. 14 is a diagram showing the compression ratio controller shown in FIG. 12.

The parity-number output from error correction controller 150 is applied to ECC encoder 95 and to ID generator 100, as shown in FIG. 11, and to compression ratio controller 145, as shown in FIG. 12. Also, compression ratio controller 145 (FIG. 12) receives clock signal from clock generator 65" so as to determine the recording bit rate, and receives the parity number from the error correction controller 150 so as to select the corresponding compression ratio. As shown in FIG. 14, compression ratio controller 145 comprises comparator 155, inverter 157 and up/down counter 160. Comparator 155 compares the value output from error correction controller 150 with the predetermined parity number of the system. The inverter 157 inverts the comparing result of comparator 155. The up/down counter 160 is operated according to the inverted comparing result and loaded with the reference compression data ratio. The up/down counter 160 causes an increment or decrement from the reference compression data ratio according to the compared result. The value of the reference compression data ratio functions as a reference value. The determinations of the error correction and the data compression ratio are described in more detail with reference to FIG. 15.

Figure 15A:
FIGS. 15A, 15B and 15C are diagrams showing the construction of an identification (ID) code and its embodiment.
Figure 15B:
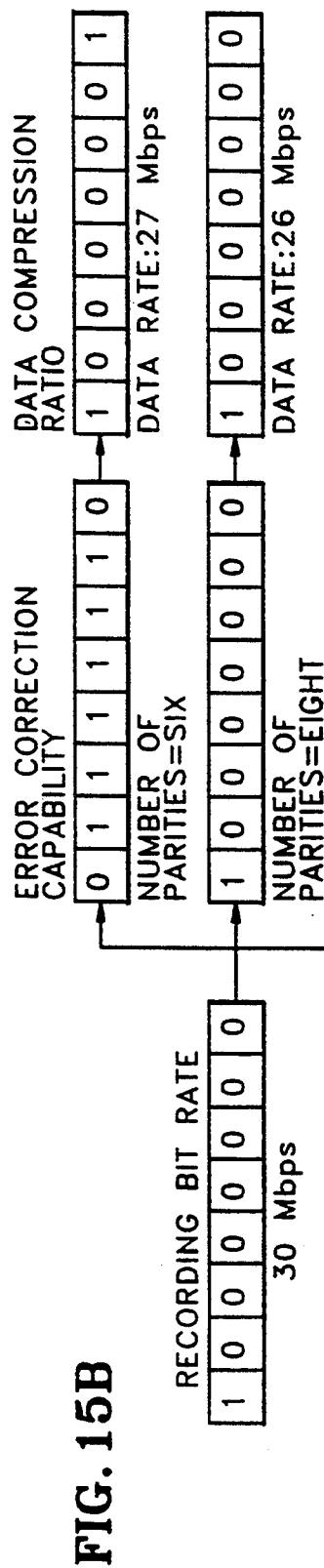
Figure 15C:
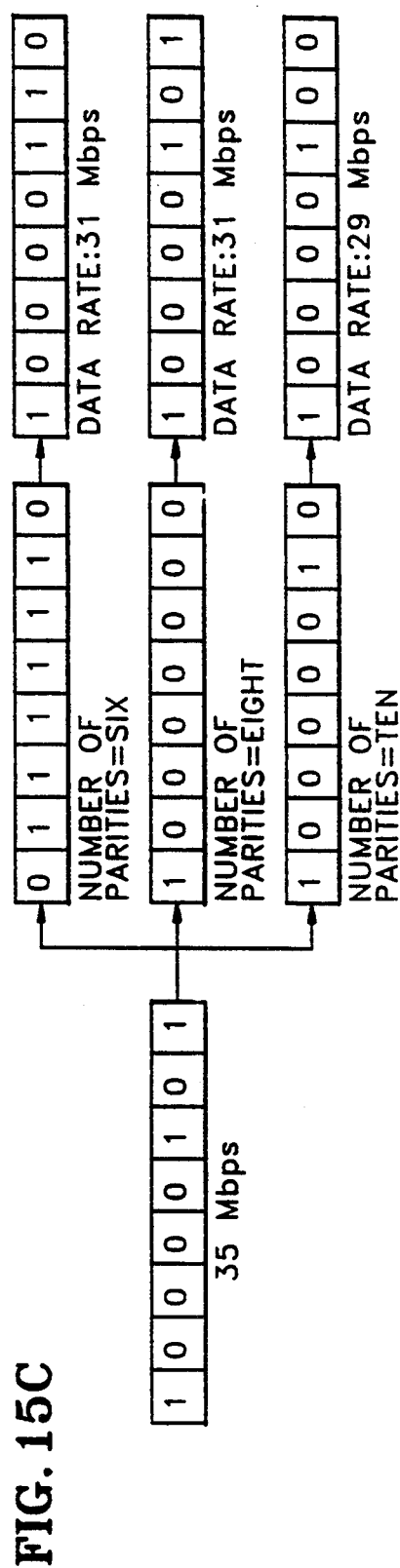

FIGS. 15A, 15B and 15C are diagrams showing the layout of an ID code and an example thereof. As shown in FIG. 15A, an ID code is composed of the eight-bit recording bit rate, eight-bit error correction capability, eight-bit data compression ratio, and a plurality of bits defining a variety of information about the system.

Here, in the remaining bits of the ID code are included information concerning audio/video classification, frames and tracks, data and parity classification, the permission or non-permission of digital copying, etc.

The ID generating principle of the present invention is that firstly, a recording bit rate is determined by the basic clock, and is recorded and simultaneously reproduced by the optimum recording detection head. Secondly, the error flag output from ECC decoder 115 is received and the number of parities is increased or decreased according to the number of errors. Therefore, the data compression ratio is controlled so as to control the after-compression data rate to reach a final recording bit rate which is pre-determined.

Hereinbelow, FIGS. 15B and 15C are described. FIG. 15B exemplifies better high band characteristics than that of FIG. 15C. When the error correction capability is set to equal for the respective systems, the case of FIG. 15C shows a smaller data compression ratio than that of FIG. 15B and an enhanced data rate. Accordingly, the picture quality and the sound performance can be enhanced.

That is, if a system such as FIG. 15C is furnished with, and recording and reproduction are performed by, the fixed specifications as in FIG. 15B, significantly degraded picture and sound will be recorded and reproduced for the given system performance. Alternatively, if a system such as FIG. 15B is furnished with, and recording and reproduction are performed by, the fixed specifications as in FIG. 15C, since the error correction capability and data compression ratio are fixed, degradation will inevitably occur in the high frequency range, and thus the picture and sound will be recorded and reproduced very poorly.

Figure 16:
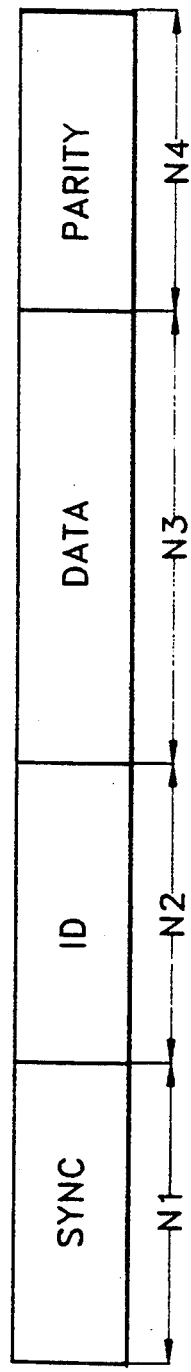
FIG. 16 is a diagram showing the construction of a synchronization block.

Recording controller 105 (FIG. 11) determines the optimum clock signal, compression ratio, and recording rate, and thereby one synchronization block is formed as shown in FIG. 16. The synchronization block comprises a synchronization signal N1, an ID signal N2, a data signal N3, and a parity signal N4. Almost always, the recording bit rate is first determined, then parity-number N4 for determining the error correction capability is determined, and finally compression rate N3 is determined. The compression ratio among the data signal is provided to data compressor 85 (FIG. 11), and thereby the input signal is compressed according to the predetermined method, to be output. Also, ID generator 100 (FIG. 11) simultaneously receives information about the clock signal, compression ratio, and error correction. Then, the signal output from ID generator 100 is mixed with the compressed signal of data compressor 85 so as to be output.

Referring to FIG. 11, the parity value which corresponds to error-correction among the output signals of recording controller 105 is applied to ECC encoder 95, and simultaneously modulator 20" modulates the output of ECC encoder 95 to be suitable for the channel characteristics according to the clock signal from recording controller 105. Then, the modulated signal is amplified to the predetermined amplitude by first amplifier 25", and is then recorded.

During reproduction of signal, the second switch 110 turns to the low node $L_2$ according to the switching control signal from the microcomputer, and thereby the reproduced signal is amplified to the predetermined amplitude by second amplifier 27", and then transferred to equalizer 70", detector 75", PLL 80" and demodulator 30" so as to be demodulated. ID detector 120 detects the error correction capability and the data compression ratio in the demodulated signal. The detected error correction capability and the data compression ratio regulate ECC decoder 115 and data expander 125, respectively.

During reproduction, the reproduced signal does not enter envelope detector 60", but enters equalizer 70" only. Then, reproduction is performed through the same process as described above except that the error flag of ECC decoder 115 does not enter recording controller 105.

Figure 17:
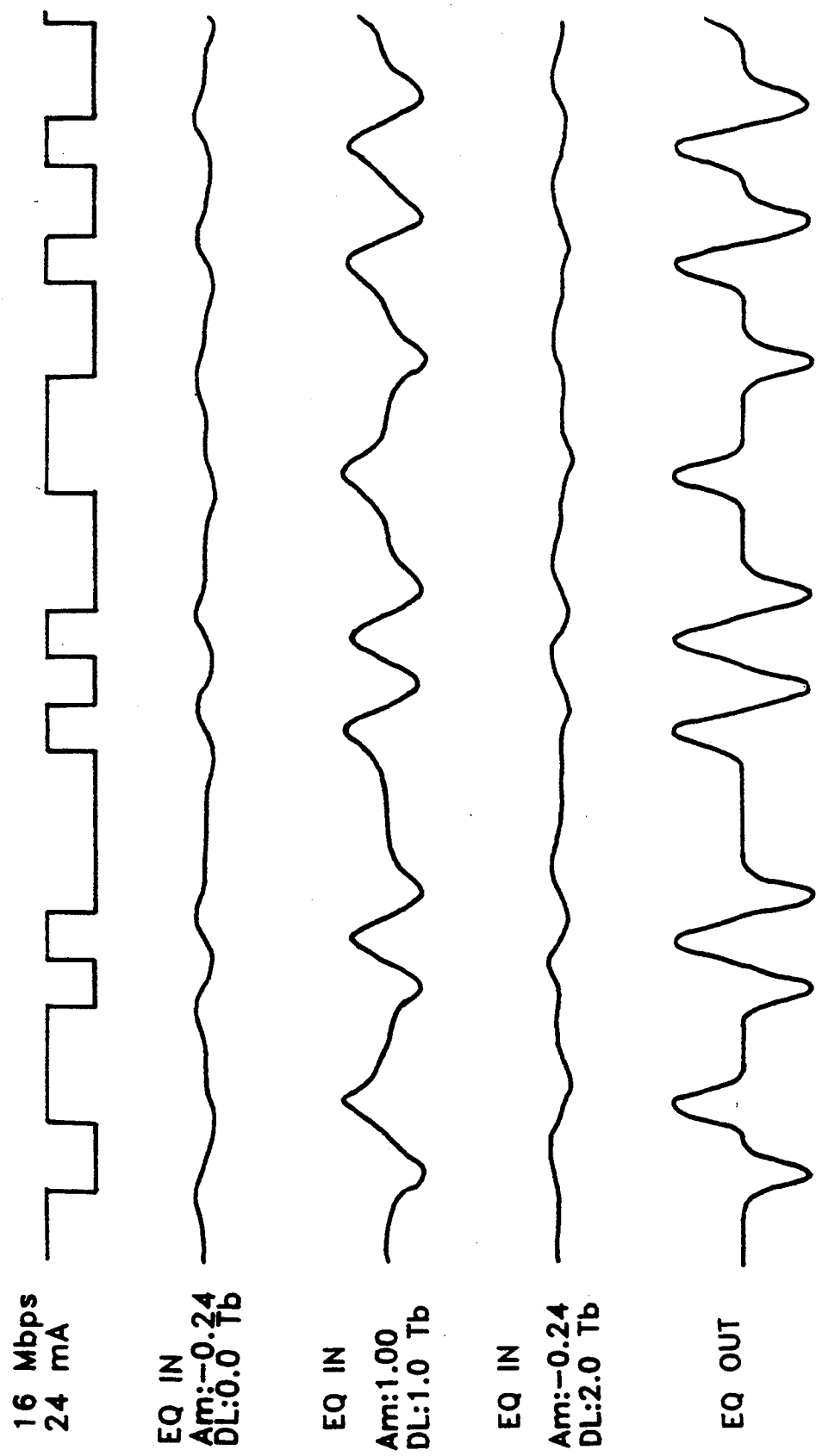
FIG. 17 is a diagram showing an embodiment of the output waveform according to the present invention.

Referring to FIG. 17, the reproduced signal according to an embodiment of the present invention is illustrated. By performing the optimum recording according to the present invention, a uniform reproduction level and no shift peak can be obtained after reproducing and equalizing, so that a distinct picture and excellent sound quality can be assured.

By the optimum recording/reproducing operation, notwithstanding the difference of head, tape or set-performance, the optimum recording can be performed in a fashion most suitable for the head, tape or set-performance. Thereby the optimum picture and sound qualities can be enjoyed, and the user's enjoyment can be enhanced.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. An optimum recording/reproducing apparatus for recording and reproducing digital data, comprising:
   (A) a recording apparatus comprising:
      a recording head for recording the digital data on a recording medium as recorded data;
      a reproducing head for reproducing the recorded data from the recording medium;
      a first memory for storing a digital signal;
      a modulator for modulating read-out data read out from the first memory according to a modulating clock signal and channel characteristics, and producing modulated data to be supplied at a modulated clock rate to the recording head;
      envelope detecting means for detecting and outputting a detected output and an envelope value from the recorded data reproduced by the reproducing head simultaneously with the recording of the modulated data on the recording medium using the recording head, said envelope value being a function of values of the recorded data input to the envelope detecting means; and
      clock generating means for generating a generated clock signal whose frequency varies according to the envelope value, whereby the modulating clock signal and the rate at which the read-out data is read out from the first memory and applied to said modulator are determined according to the generated clock signal; and
   (B) a reproducing apparatus comprising:
      a detector for detecting a reproduced digital signal from the recorded data reproduced by the reproducing head and producing an output signal thereby;
      a phase-locked loop (PLL) circuit for detecting the modulated clock rate from the output signal and producing a reproduction clock signal therefrom;
      a demodulator for demodulating the reproduced digital signal according to the reproduction clock signal and the channel characteristics, and producing demodulated data thereby; and
      a second memory for temporarily storing therein the demodulated data and for outputting the demodulated data according to the reproduction clock signal.

2. The optimum recording/reproducing apparatus as claimed in claim 1, further comprising a supplementary detection head for detecting said recorded data simultaneously while said digital data is being recorded.

3. The optimum recording/reproducing apparatus as claimed in claim 1, further comprising switching means for switching between (a) directing said recorded data reproduced by said reproducing head to said envelope detecting means of said recording apparatus and (b) directing said recorded data reproduced by said reproducing head to said reproducing apparatus.

4. The optimum recording/reproducing apparatus as claimed in claim 1, wherein said envelope value is a measurement of the absolute value of the difference between the upper and lower values of said recorded data reproduced by said reproducing head during recording of said read-out data on said recording medium.

5. The optimum recording/reproducing apparatus as claimed in claim 1, wherein said clock generating means comprises:
   an integrator for integrating said detected output from said envelope detecting means and producing an integrated output;
   a comparator for comparing said detected output from said envelope detecting means with the integrated output and outputting a comparison result; and
   a voltage controlled oscillator for generating said generated clock signal, which is varied according to the comparison result.

6. The optimum recording/reproducing apparatus as claimed in claim 1, wherein said clock generating means comprises:
   an integrator for integrating the detected output from said envelope detecting means and producing an integrated output;
   a comparator for comparing said detected output from said envelope detecting means with the integrated output and outputting a first comparison result;
   a serial-to-parallel converter for converting the first comparison result into parallel data;
   a plurality of comparators for comparing data comprised by said parallel data with predetermined reference values, respectively, and producing a plurality of second comparison results; and
   a plurality of clock generators for generating said generated clock signal in accordance with the plurality of second comparison results.

7. An optimum recording/reproducing apparatus for recording and reproducing digital data, comprising:
   (A) a recording apparatus comprising:
      a recording head for recording the digital data on a recording medium as recorded data;
      a reproducing head for reproducing the recorded data from the recording medium;

a data compressor for compressing the digital data for recording by a data compression ratio and producing compressed data;

an ID generator for receiving ID information and generating an ID signal;

a mixer for mixing the ID signal with the compressed data to produce mixed data;

error correcting means for detecting errors in the mixed data, and for processing the mixed data according to an error correction capability and outputting error-corrected data;

a modulator for modulating the error-corrected data according to a modulating clock signal and channel characteristics, and producing modulated data to be supplied at a modulated clock rate to the recording head;

envelope detecting means for detecting and outputting a detected output and an envelope value from the recorded data reproduced by the reproducing head simultaneously with the recording of the modulated data on the recording medium using the recording head, said envelope value being a function of values of the recorded data input to the envelope detecting means; and recording controlling means for determining the modulating clock signal, the error correction capability, the data compression ratio, and the ID information, according to the envelope value and the error flag; and (B) a reproducing apparatus comprising:

a detector for detecting a reproduced digital signal from the recorded data reproduced by the reproducing head and producing an output signal thereby;

a phase-locked loop (PLL) circuit for detecting the modulated clock rate from the output signal and producing a reproduction clock signal therefrom;

a demodulator for demodulating the reproduced digital signal according to the reproduction clock signal and the channel characteristics, and producing demodulated data thereby;

an ID detector for detecting the ID signal from the demodulated data;

an error correction decoder for performing error correction decoding according to the ID signal detected by the ID detector and producing a decoded signal and an error flag; and a data expander for expanding the decoded signal by an expansion ratio determined according to the ID signal detected by the ID detector.

8. The optimum recording/reproducing apparatus as claimed in claim 7, further comprising a supplementary detection head for detecting said recorded data simultaneously while said digital data is being recorded.

9. The optimum recording/reproducing apparatus as claimed in claim 7, wherein said envelope detecting means produces said envelope value corresponding to the absolute value of the difference between the upper and lower limits of said recorded data reproduced by said reproducing head during recording of said read-out data on said recording medium.

10. The optimum recording/reproducing apparatus as claimed in claim 7, wherein said recording controlling means comprises:

clock generating means for generating a generated clock signal whose frequency varies according to said envelope value;

an error counter for counting said error flags from said error correction decoder and producing an error count value;

an error correction controller for receiving the generated clock signal and the error count value, and for controlling determination of said error correction capability thereby; and a compression ratio controller for controlling said data compression ratio according to the generated clock signal and said error correction capability.

11. The optimum recording/reproducing apparatus as claimed in claim 10, wherein said clock generating means comprises:

an integrator for integrating said detected output from said envelope detecting means and producing an integrated output;

a comparator for comparing said detected output from said envelope detecting means with the integrated output and outputting a comparison result; and a voltage controlled oscillator for generating said generated clock signal, which is varied according to the comparison result.

12. The optimum recording/reproducing apparatus as claimed in claim 10, wherein said clock generating means comprises:

an integrator for integrating the detected output from said envelope detecting means and producing an integrated output;

a comparator for comparing said detected output from said envelope detecting means with the integrated output and outputting a first comparison result;

a serial-to-parallel converter for converting the first comparison result into parallel data;

a plurality of comparators for comparing data comprised by said parallel data with predetermined reference values, respectively, and producing a plurality of second comparison results; and a plurality of clock generators for generating said generated clock signal in accordance with the plurality of second comparison results.

13. The optimum recording/reproducing apparatus as claimed in claim 10, wherein said error correction controller comprises a comparator for comparing the count value of said error counter with a predetermined reference value and generating a comparison result, and an up/down counter for up/down-counting a reference parity value according to the comparison result.

14. The optimum recording/reproducing apparatus as claimed in claim 10, wherein said error correction controller comprises a comparator for comparing the count value of said error counter with a predetermined reference value and generating a comparison result, and an up/down counter for up/down-counting a reference compression ratio in inverse proportion to said comparison result.

15. An optimum recording apparatus for recording digital data, comprising:

a recording head for recording the digital data on a recording medium as recorded data;

a reproducing head for reproducing the recorded data from the recording medium;

a first memory for storing a digital signal;

a modulator for modulating read-out data read out from the first memory according to a modulating clock signal and channel characteristics, and producing modulated data to be supplied at a modulated clock rate to the recording head;

envelope detecting means for detecting and outputting a detected output and an envelope value from the recorded data reproduced by the reproducing head simultaneously with the recording of the modulated data on the recording medium using the recording head, said envelope value being indicative of the signal envelope of the recorded data; and clock generating means for generating a generated clock signal whose frequency varies according to the envelope value, whereby the modulating clock signal and the rate at which the read-out data is read out from the first memory and applied to said modulator are determined according to the generated clock signal.

16. The optimum recording apparatus as claimed in claim 15, further comprising a supplementary detection head for detecting said recorded data simultaneously while said digital data is being recorded.

17. The optimum recording apparatus as claimed in claim 15, wherein said envelope value is a measurement of the absolute value of the difference between the upper and lower values of said recorded data reproduced by said reproducing head during recording of said read-out data on said recording medium.

18. An optimum reproducing apparatus for reproducing digital data, comprising:

a reproducing head for reproducing recorded data from a recording medium;

a detector for detecting a digital signal from the recorded data reproduced by the reproducing head and producing an output signal thereby;

a phase-locked loop (PLL) circuit for detecting a modulated clock rate from the output signal and producing a clock signal therefrom;

a demodulator for demodulating the digital signal according to the clock signal, and producing demodulated data thereby; and a memory for temporarily storing therein the demodulated data and for outputting the demodulated data according to the clock signal.

* * * * *